U̇nited States Patent Office 2,750,350
Patented June 12, 1956

2,750,350

DISPERSION POLYMERIZATION PROCESS FOR TETRAFLUOROETHYLENE

Adam Edgar Kroll, Kennett Square, Pa., assignor to E. I. du Pont de Nemours and Company, Wilmington, Del., a corporation of Delaware No Drawing. Application May 12, 1953, Serial No. 354,652

14 Claims. (Cl. 260—29.6)

This invention relates to a process for polymerizing tetrafluoroethylene, and more specifically to an improved process for preparing aqueous colloidal dispersions of polymeric tetrafluoroethylene by direct polymerization.

In the main there have been two general methods available for preparing aqueous dispersions of polytetrafluoroethylene; namely, by polymerizing monomeric tetrafluoroethylene in an aqueous medium to yield relatively low concentrations of colloidal polymer in the dispersed state, and then concentrating this low solids dispersion to a higher solids dispersion by one of several known methods; and by direct polymerization of the monomer in an aqueous medium to obtain a high solids dispersion without the necessity for further concentrating the dispersion. Usually the latter procedure is preferred for economic reasons, but technical difficulties have been encountered when attempting to prepare by direct polymerization aqueous dispersions containing the colloidal polymer in concentrations of the order of 35%–50% by weight. Some of these difficulties have been overcome by advances in the art such as the employment of special types of dispersing agents to increase the stability of the polymer dispersion and employment of certain saturated hydrocarbons for permitting the production of dispersions containing higher polymer solids content before coagulation of the polymer begins. Despite these advances, the production of concentrated polytetrafluoroethylene dispersions directly by polymerization in large batches or on a continuous basis has been accompanied by difficulties in reproducing the same rate of polymerization in spite of the fact that the processing conditions and quantities of ingredients have been held as constant as possible.

It is an object of this invention to provide an improved process for polymerizing tetrafluoroethylene in an aqueous medium to yield an aqueous dispersion containing at least 25% polymer in the colloidally dispersed state. Another object is to provide a process for producing aqueous dispersions of polymeric tetrafluoroethylene at more reproducible rates. A further object is to increase the rate of polymerization of tetrafluoroethylene in an aqueous medium to yield stable colloidal polymer dispersions containing 35%–50% dispersed polymer in a minimum time accompanied by only small amounts of coagulum formed. Other objects will be apparent from the description of the invention given below.

The above objects are accomplished by a process for the polymerization of tetrafluoroethylene in an aqueous medium to obtain a colloidal dispersion of polymeric tetrafluoroethylene which process comprises the step of carrying out said polymerization in the presence of a water soluble ionizable dispersing agent, a catalytic amount of a water soluble peroxy compound of a saturated aliphatic dibasic acid as initiator for the polymerization, and a quantity of powdered iron not exceeding 10 parts per million (p. p. m.), by weight of the water present. Preferably the polymerization of the tetrafluoroethylene is carried out in an aqueous acidic medium containing said dispersing agent, a catalytic amount of a water soluble peroxide of a saturated aliphatic dibasic acid having 4 to 5 carbon atoms, inclusive, 0.5 p. p. m. to 10 p. p. m. of powdered iron, by weight of the water, and 0.1%–12%, by weight of the water, of a saturated hydrocarbon having more than 12 carbon atoms and which is liquid under the polymerization conditions. The ionizable dispersing agent preferably is a compound having a solubility in water of at least 0.1% at 100° C. and comprising an ionic hydrophilic portion and a hydrophobic portion, said latter being a fluoroalkyl group containing at least 6 aliphatic carbon atoms, all except at most one of which, and that one the closest to said solubilizing group, bearing at least 2 fluorine atoms, the terminal carbon atom bearing in addition an atom from the group consisting of hydrogen and fluorine.

The conditions for carrying out the polymerization of the tetrafluoroethylene in the aqueous medium containing the specified initiator, powdered iron, and other ingredients, is in accordance with known procedures. The polymerization may be carried out batch-wise or continuously. Temperatures of 0° C. to 100° C. and pressures of 1 to 75 atmospheres are normally used, although for particular purposes temperatures and pressures outside of this range may be used as disclosed in the prior art. It is usually preferred to operate at temperatures of 50° C. to 95° C. and at pressures of 5 to 40 atmospheres for obtaining optimum results.

A suitable procedure for carrying out the present invention involves charging a pressure vessel such as an autoclave with part or all of the water, which may be preheated to a temperature just under that at which the polymerization is to be carried out, evacuating the vessel to remove the major portion of oxygen, adding the initiator, dispersing agent, and saturated hydrocarbon if desired, followed by addition of the powdered iron in an amount of less than 10 p. p. m. based on the weight of water present in the vessel. The reactants are then agitated by rocking the pressure vessel or starting the agitator, depending on the type of vessel used, while the vessel is charged with tetrafluoroethylene to a suitable pressure, e. g. 30 atmospheres. The vessel is then heated to bring the contents to the desired temperature, for example, 85° C. Continuous agitation is maintained throughout the polymerization reaction accompanied by addition of sufficient tetrafluoroethylene to maintain the pressure within the vessel substantially constant until the desired concentration of colloidally dispersed polymer is formed. Upon opening the vessel and separating the aqueous polymer dispersion from any coagulated polymer that has formed, there is obtained a dispersion containing up to 35%–50% by weight of polytetrafluoroethylene in colloidally dispersed form.

The invention is illustrated in further detail but not limited by the following examples in which the proportions are by weight unless otherwise specified.

*Example 1.*—A series of terafluoroethylene polymerizations was carried out using the same ingredients under approximately the same conditions with and without the addition of powdered iron in order to show the effect of the powdered iron and the quantity of same on the rate of polymerization and reproducibility of the reaction measured by the polymer formed. In this series of polymerizations the indicated p. p. m. of powdered iron, based on the weight of water, as given in the table below, was first added to a 150 gallon horizontal autoclave which was then evacuated to remove the major portion of oxygen. The autoclave was equipped with a paddle agitator and under agitation there were added 4.86 parts of paraffin wax (melting point 55° C.–60° C.) which had been premelted in 44.6 parts of water, and 0.44 part of the ammonium salt of perfluorocaprylic acid having the formula $F(CF_2)_7COONH_4$, and 0.10 part of disuccinic acid peroxide having the formula $(HOOCCH_2CH_2CO)_2O_2$, dissolved in 50 parts water. The vessel was then pressured with gaseous tetrafluoroethylene until the pressure gauge on the vessel read 27 atmospheres, while the water jackets surrounding the vessel were fed with steam until the reaction medium inside reached a temperature of 90° C. Throughout the polymerization cycle, the terafluoroethylene was automatically metered to the reaction vessel to maintain the pressure therein constant at approximately 27 atmospheres, while the temperature of the aqueous medium was held at 85° C.–90° C. by thermostatic control of the hot and cold circulating water through the jacket surrounding the vessel. Continuous agitation was maintained throughout the reaction. In all cases the pH of the aqueous medium was in the range of 2.75 to 3.75. Table I below shows the total reaction time of each polymerization run, the quantity of powdered iron employed, the overall reaction rate in pounds of polymer formed per minute, and the percent by weight of solids in the product, which represents the amount of polytetrafluoroethylene (dry weight) in colloidally dispersed form based on the total weight of the reaction medium (which in the final product is essentially all polymer plus water).

*Table I*

| Run | Time (min.) | Powdered Iron (p. p. m.) | Reaction Rate (lbs./min.) | Percent Solids |
| --- | --- | --- | --- | --- |
| A | 210 | 0 | 2.38 | 44 |
| B | 133 | 0 | 4.43 | 48 |
| C | 330 | 0 | 1.50 | 48 |
| D | 94 | 2 | 5.3 | 42 |
| E | 73 | 2 | 5.1 | 35 |
| F | 71 | 2 | 5.30 | 35 |
| G | 64 | 2 | 5.9 | 35 |
| J | 87 | 10 | 6.35 | 47 |
| K | 93 | 10 | 6.78 | 47 |

After the indicated time in each run the agitation was stopped, the contents of the autoclave were cooled, and the wet parraffin layer, containing any small amount of coagulated polymer which had formed, was drawn off the top of the autoclave. The remaining product was a stable aqueous colloidal dispersion of polytetrafluoroethylene in a concentration given in the last column above.

The above nine polymerizations illustrate two points. First, the reaction rate is much more constant and reproducible when powdered iron is used than in runs A–C without powdered iron, where the reaction rate varies by as much as 200%. Secondly, the use of powdered iron in runs J and K indicate 50%–350% higher reaction rates and shorter reaction times than in runs A–C using no powdered iron for producing the same concentration of dispersed polymer.

*Example 2.*—The same procedure as described in Example 1, with exceptions noted below, was used for mixing the reactants and for polymerizing in the case of five additional runs. These were made in order to show the effect of using different amounts of powdered iron on the amount of coagulated polymer formed during the polymerization cycle of tetrafluoroethylene. There were employed, in each of the five runs, 100 parts of distilled water, 0.10 part of disuccinic acid peroxide, 0.50 part of ammonium perfluorocaprylate, and 6.32 parts of paraffin wax (melting point 55° C.–60° C.). The temperature of the reaction mixture was kept at 85° C. for the times indicated in the table below and the pressure due to the tetrafluoroethylene gas introduced into the vessel was maintained at approximately 27 atmospheres throughout the polymerization cycle by adding more tetrafluoroethylene as required.

*Table II*

| Run | Time (min.) | Powdered Iron (p. p. m.) | Percent Solids | Percent Coagulum |
| --- | --- | --- | --- | --- |
| A | 97 | 0 | 48.5 | .72 |
| B | 90 | 0 | 47.7 | .53 |
| C | 81 | 10 | 48.5 | 1.33 |
| D | 63 | 50 | 48.5 | 8.41 |
| E | 72 | 50 | 47.3 | 6.37 |

The percent solids (dry weight) represents the amount of polytetrafluoroethylene in colloidally dispersed form based on the total weight of the aqueous dispersion, as in Example 1. The percent coagulum represents the amount of coagulated polymer (dry weight) which is separated from the aqueous dispersion after polymerization, based on the dry weight of the colloidal polymer in dispersion. In all runs the pH of the aqueous medium was in the range of 2.75 to 3.75.

It is obvious from the results in Table II that the amount of coagulum formed increases with an increase in the amount of powdered iron used in the polymerization, other conditions being held constant. It should also be obvious that in preparing concentrated dispersions of colloidal polymer it is desirable to keep coagulum formation at a minimum since the latter must be discarded. It is considered that coagulum formation up to approximately 1% is not too objectionable but amounts much greater than 1% become economically undesirable when operating on a large commercial scale. This is another reason why the amount of powdered iron used to increase the polymerization rate and achieve the objects of this invention is critical, especially at the upper limit, for it has been found that it is difficult to hold the amount of coagulum formation close to 1% if the amount of powdered iron exceeds 10 p. p. m. The effect of using more than 10 p. p. m. powdered iron on the coagulum formation is much more pronounced when producing the more concentrated polymer dispersions than when operating under conditions to obtain polymer dispersions of lower concentration. Thus as shown in runs D and E in Table II, 50 p. p. m. of powdered iron produces an intolerable amount of coagulum in dispersions containing approximately 45%–50% of polymer solids, compared with only approximately 1% coagulum formation in run C when operating at the upper limit of 10 p. p. m. powdered iron admissible in the practice of this invention.

The dispersing agent used in the polymerization may be any suitable water-soluble ionizable dispersing agent which will permit the production of aqueous dispersions of colloidal polymeric tetrafluoroethylene containing at least 25% by weight of polymer solids. Some of the most desirable dispersing agents are those compounds having a solubility in water of at least 0.1% at 100° C. and comprising an ionic hydrophilic portion and a hydrophobic portion, said latter being a fluoroalkyl group containing at least 6 aliphatic carbon atoms, all except at most one of which, and that one the closest to said solubilizing group, bearing at least 2 fluorine atoms, the terminal carbon atom bearing in addition an atom from the group consisting of hydrogen and fluorine. These compounds are described in U. S. Patent 2,559,752, issued to K. L. Berry. Examples of the preferred dispersing agents are those water soluble salts from the group consisting of the alkali metal, ammonium, and substituted ammonium salts of a polyfluoroalkanoic acid having the formula $B(CF_2)_nCOOH$, wherein B is from the group consisting of hydrogen and fluorine and $n$ is an integer from 6 to 20 inclusive, and preferably those salts of an acid having the formula $F(CF_2)_nCOOH$, wherein $n$ is an integer from 6 to 12 inclusive. Specific examples include potassium hexadecafluorononanoate, ammonium eicosafluoroundecanoate, ammonium dodecafluoroheptanoate, ammonium hexadecafluorononanoate, potassium eicosafluoroundecanoate, sodium dodecafluoroheptanoate, ammonium perfluoropelargonate, sodium perfluorocaproate, ammonium perfluorocaprylate, and the like. Other examples of these preferred dispersing agents containing a fluoroalkyl group are disclosed in U. S. Patent 2,559,752. Mixtures of two or more dispersing agents are also suitable for use in this invention. The amount of dispersing agent used is not particularly critical, and may vary, for example, from 0.01% to 10% by weight of the water used.

It is also preferred in making the more concentrated dispersions in this invention to employ one of the saturated hydrocarbons as described in U. S. Patent 2,612,484, issued to S. G. Bankoff. As pointed out in the Bankoff patent, these hydrocarbons are efficient stabilizing agents against coagulation of the polymer and permit agitation of the reactants without danger of coagulating the polymer at low concentrations. These hydrocarbon anticoagulants also help to sequester and remove any coagulated polymer formed by separating from the aqueous medium and rising to the surface of the reaction mixture. This facilitates separation and the removal of the coagulated polymer from the colloidal particles of polymer in the aqueous medium. The saturated hydrocarbons which are suitable for use in this invention include those having more than 12 carbon atoms which are liquid under the polymerization conditions. Specific examples include octadecane, eicosane, tetradecane, cetane, mixtures of hydrocarbons commonly known as white mineral oil, and paraffin waxes having melting points below the temperature used for polymerization of the tetrafluoroethylene, e. g. normally below 100° C. These hydrocarbons are added to the aqueous medium before polymerization in proportions of 0.1%–12% by weight based on the water present. Usually it is preferred to use from 1%–5% of these saturated hydrocarbons.

The initiator employed for polymerization of the tetrafluoroethylene in this invention is a water soluble peroxy compound of a saturated aliphatic dibasic acid, as described in U. S. Patent 2,534,058, issued to M. M. Renfrew. These compounds contain peroxidic oxygen in the form of a grouping of the formula

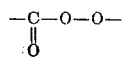

and are sometimes referred to as acid peroxides and peracids, cf. Thorpe, Dictionary of Applied Chemistry, fourth edition, vol. IX, p. 299 (1949). Examples of these peroxy compounds include disuccinic acid peroxide, diglutaric acid peroxide, monopersuccinic acid, and the like. The catalyst will generally be employed in an amount of 0.05% to 0.5% by weight of the water present.

The powdered iron is one of the most critical factors in this invention, not the least important of which in that connection is the presence of the correct amount in the aqueous polymerization medium. The powdered iron is available commercially, and is generally known as reduced iron powder, being essentially pure iron in the metallic state free from all oxidation products. One of the advantages of this invention is the increased rate of polymerization achieved due to the presence of small proportions of powdered iron. However, when more than 10 p. p. m. of powdered iron are employed, based on the weight of water present, the rate of reaction tends to be too high, the peroxy compound used as initiator tends to be too rapidly consumed, the polymer formed begins to coagulate too rapidly from concentrated dispersions, and most important of all, the increased rate of reaction produces a corresponding increase in temperature and when handling large quantities of monomer it becomes extremely difficult to cool the reactants sufficiently to control adequately the temperature throughout the polymerization reaction. Of course, in order to gain any advantage from this invention enough powdered iron must be used to produce a noticeable change in rate and reproducibility of polymerization compared with those polymerizations containing no powdered iron, and in this respect it has been found that in most cases at least 0.5 p. p. m. of powdered iron is beneficial. Even 0.5–1.0 p. p. m. shows a significant increase in rate of polymerization. The preferred amount of powdered iron for producing dispersions containing 35%–50% colloidal polymeric tetrafluoroethylene will usually be in the range of 1 p. p. m. to 5 p. p. m. by weight of the water present, since in this range the dispersed polymer is formed at economical rates with usually less than 1% coagulum formation.

The present invention may be used to polymerize tetrafluoroethylene by itself as shown in the examples and may also be used to copolymerize tetrafluoroethylene with up to 25% of other ethylenically unsaturated copolymerizable monomers such as ethylene, methyl methacrylate, styrene, vinyl fluoride, chlorotrifluoroethylene, hexafluoropropylene, perfluorobutadiene, hexafluorocyclobutene, perfluoroisobutylene, trifluoroethylene, perfluoroheptene-1, and the like. That is, aqueous dispersions of these copolymers may be made in which the tetrafluoroethylene content of the copolymer may vary from 75%–100% by weight, whereas the remainder of the copolymer may vary up to 25% by weight of one or more of the copolymerizable monomers. The invention may also be used to polymerize tetrafluoroethylene in the presence of a small amount of a non-polymerizable compound (e. g. methanol, ethanol, or chloroform), which forms the end groups of the polymer chain. Such polymers containing end groups supplied by non-polymerizable compounds have in the past been referred to as telomers. Hence, the present invention is applicable to the production of aqueous dispersions of colloidal polymeric tetrafluoroethylene, whether said polymeric tetrafluoroethylene is in the form of a homopolymer, copolymer, or telomer.

The ratio of water to monomer in the practice of this invention is not critical but merely a matter of choice depending upon the size of the reaction vessel and other obvious factors. In general the water is usually present on a weight basis in a ratio of greater than one part of water per part of monomer, and preferably at least 1.5 to 5 parts of water per part of monomer. The reaction vessel for carrying out the present process may be constructed of any convenient material which is normally resistant to corrosion under polymerization conditions so that contamination of the polymer is minimized. It is satisfactory to operate in apparatus constructed of or lined with such materials as stainless steel, nickel, corrosion resistant alloy steels, platinum, silver, glass, porcelain, and the like. For best results the pH of the aqueous medium during polymerization should be less than 7 in order to avoid any tendency towards precipitation of iron hydroxide. Generally, the fastest polymerization rates will occur when the pH is in the range of 2 to 5.

The chief advantages of this invention lie in the fact that it provides a process for increasing the rate of production of aqueous colloidal dispersions of polymeric tetrafluoroethylene containing at least 25% dispersed polymer by weight and up to 50% polymer and even higher, as well as for permitting said dispersions to be formed at more reproducible rates, either batchwise or in a continuous manner. The improved process of this invention also permits an increaesd rate of production of stable polymer dispersions, especially the more concentrated ones of 35%–50% solids, without leading to any significant increase in the amount of coagulated polymer formed over that produced heretofore under otherwise equivalent conditions but in the absence of the specified critical amount of powdered iron. It is now realized that adventitious amounts of iron are probably introduced into the polymerization medium from various sources, such as from the walls of the vessel in which the polymerization is carried out, from iron impurities in the peroxy compound used as initiator, and possibly from other sources. These uncontrolled amounts of iron impurities are believed to cause the variable rates of polymerization and variable concentrations of polymer solids. Although the invention is not limited by any theory as to how the powdered iron takes a part in the polymerization reaction, it is believed that the addition of the specified critical amount of powdered iron to the polymerization medium counterbalances the effect of the iron impurities the amounts of which it is not possible to control from batch to batch.

The aqueous colloidal dispersions of polymeric tetrafluoroethylene obtained in accordance with this invention have many valuable uses. They may be used as such for casting films; for coating and impregnating textiles, glass fabric, ceramics, metal and wood; or the more concentrated dispersions may be first diluted and/or mixed with other additives such as fillers, stabilizers, dispersing agents, other polymers and lubricants, before further use; or the dispersions may be further concentrated by known methods before further use; or the dispersions may be coagulated by agitation, by addition of acetone and other coagulating agents, or by other methods normally used for coagulation, following which the coagulated polymer may be separated from the aqueous phase and dried to yield a product in the form of a finely divided powder which is highly useful for extrusion, molding, and otherwise fabricating into shaped articles. It is generally desirable to mix with the dry, finely divided polymer powder lubricants or other processing aids in order to facilitate fabrication of the polymer into useful articles, such as sheets, rods, tubes, coated wires, coated fabrics, films, filaments, and the like.

I claim:

1. In the polymerization of tetrafluoroethylene in an aqueous medium to obtain a colloidal dispersion of polymer, the step which comprises carrying out said polymerization in an aqueous acidic medium in the presence of a water-soluble ionizable dispersing agent, a catalytic amount of a water-soluble peroxy compound of a saturated aliphatic dibasic acid, said water-soluble peroxy compound having peroxidic oxygen in the form of a grouping of the formula

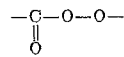

and a quantity of powdered iron not exceeding 10 parts per million by weight of the water present.

2. Process of claim 1 in which the polymerization is carried out in the presence of 0.5 part per million to 10 parts per million of powdered iron based on the weight of water present.

3. Process of claim 1 in which the polymerization is carried out in the presence of 1 part per million to 5 parts per million of powdered iron based on the weight of water present.

4. Process of claim 1 in which the polymerization is carried out in an aqueous medium at a pH in the range of 2 to 5.

5. In the polymerization of tetrafluoroethylene to obtain an aqueous colloidal dispersion of polymer, the step which comprises carrying out said polymerization in an aqueous acidic medium containing, as an ionizable dispersing agent, a compound having a solubility in water of at least 0.1% at 100° C. and comprising an ionic hydrophilic portion and a hydrophobic portion, said latter being a fluoroalkyl group containing at least 6 aliphatic carbon atoms, all except at most one of which, and that one the closest to said solubilizing group, bearing at least 2 fluorine atoms, the terminal carbon atom bearing in addition an atom from the group consisting of hydrogen and fluorine, a catalytic amount of a water soluble peroxide of a saturated aliphatic diabasic acid having 4 to 5 carbon atoms, inclusive, said water-soluble peroxide having peroxidic oxygen in the form of a grouping of the formula

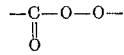

0.5 part to 10 parts per million of powdered iron, by weight of the water, and 0.1%–12%, by weight of the water, of a saturated hydrocarbon having more than 12 carbon atoms and which is liquid under the polymerization conditions.

6. Process of claim 5 in which said saturated hydrocarbon has more than 16 carbon atoms and is present in the amount of 1%–5% by weight of the water present.

7. Process of claim 5 in which said saturated hydrocarbon is a mixture of hydrocarbons known as white mineral oil.

8. Process of claim 5 in which said saturated hydrocarbon is a paraffin wax having a melting point below the temperature at which said polymerization is carried out.

9. Process of claim 5 in which said water soluble peroxide is disuccinic acid peroxide.

10. Process of claim 5 in which said aqueous medium is at a pH of 2 to 5.

11. Process of claim 10 in which said aqueous medium contains 1 part to 5 parts per million of powdered iron by weight of the water.

12. Process for preparing a concentrated aqueous colloidal dispersion of polytetrafluoroethylene which comprises forming an aqueous acidic medium containing, as an ionizable dispersing agent, a salt having a solubility in water of at least 0.1% at 100° C. from the group consisting of the alkali metal, ammonium, and substituted ammonium salts of a polyfluoroalkanoic acid having the formula $B(CF_2)_nCOOH$, wherein B is from the group consisting of hydrogen and fluorine and $n$ is an integer from 6 to 20, inclusive, tetrafluoroethylene, a water soluble peroxide of a saturated aliphatic dibasic acid having 4 to 5 carbon atoms inclusive, said water-soluble peroxide having peroxidic oxygen in the form of a grouping of the formula

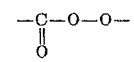

0.1%–12% of a saturated hydrocarbon having more than 16 carbon atoms and liquid under the polymerization conditions, and 0.5 p. p. m. to 10 p. p. m. of powdered iron, all of said proportions being based on the weight of water present, then subjecting said aqueous medium to polymerization conditions until an aqueous colloidal dispersion of polytetrafluoroethylene containing 35%–50% colloidal polymer by weight of the total mixture is obtained.

13. Process of claim 12 in which said polyfluoroalkanoic acid has the formula $F(CF_2)_nCOOH$ wherein $n$ is an integer from 6 to 12 inclusive.

14. Process of claim 12 in which said aqueous medium is at a pH in the range of 2 to 5, and the amount of powdered iron present is in the range of 1 part to 5 parts per million, by weight of the water present.

References Cited in the file of this patent

UNITED STATES PATENTS 2,534,058     Renfrew     Dec. 12, 1950